United States Patent Office 3,294,321
Patented Dec. 27, 1966

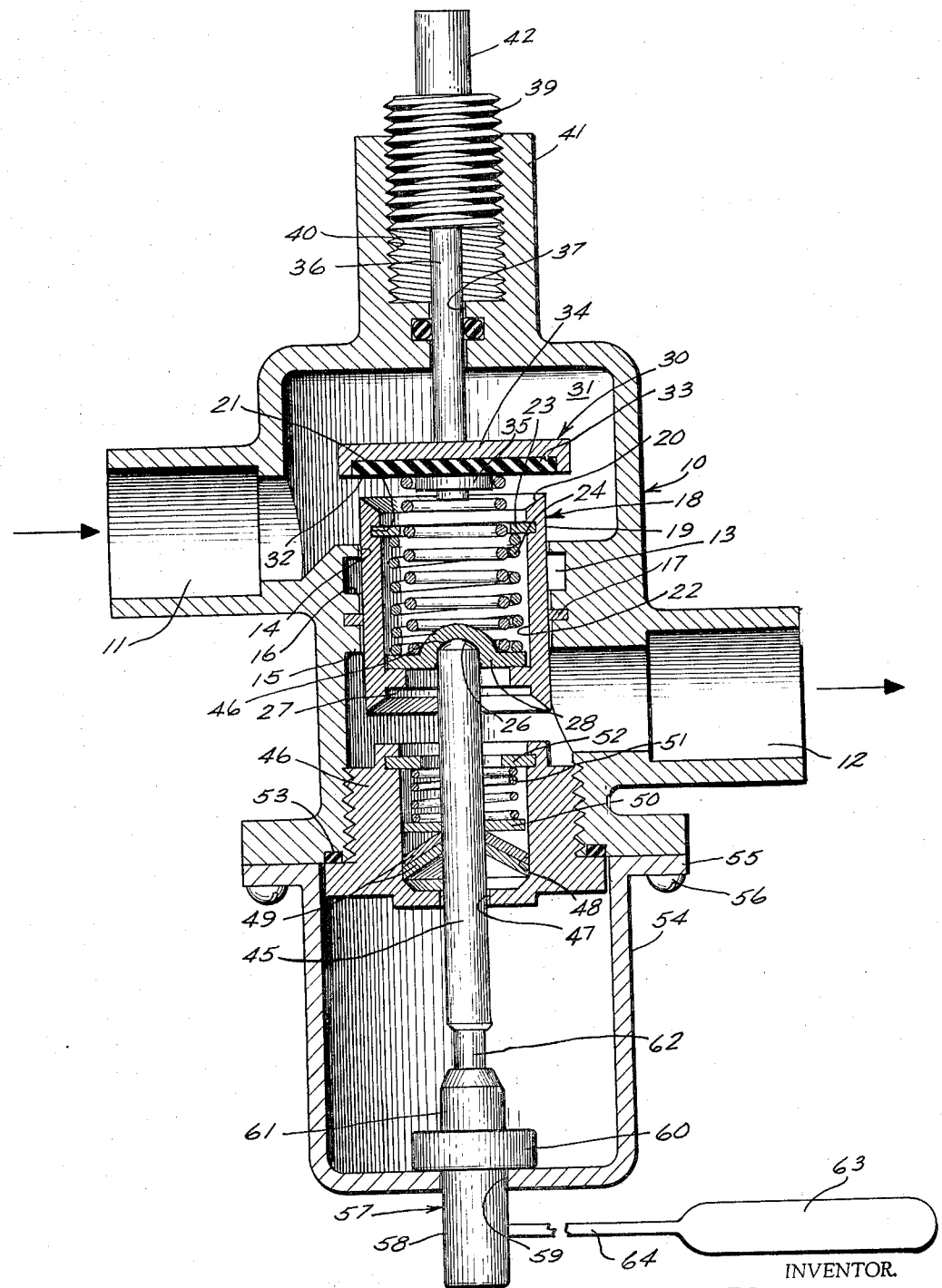

3,294,321
ZONE THERMOSTATIC VALVE WITH
MULTIPLE MOVABLE SEATS
Robert W. Couffer, Deerfield, Ill., assignor to The Dole
Valve Company, Morton Grove, Ill., a corporation of
Illinois
Filed Feb. 21, 1964, Ser. No. 346,519
2 Claims. (Cl. 236—99)

The present invention relates to fluid control valve and more particularly relates to thermostatically actuable control valves of the type employing a pair of mutually coacting independently movable valve members.

The instant invention has particular application in connection with zone valves such as are employed to control the flow of hot or cold water through a convector in response to variances in temperature in the zone within which the convector is located.

Broadly speaking, the instant invention may be characterized as being embodied in valve body having an inlet and an outlet and a passageway communicating the inlet with the outlet and having a sleeve valve axially slidably movable within the passageway. A flat valving member is cooperable with and seatable on an annular lip of the sleeve valve to control the flow of fluid between the valving member and the lip of the sleeve valve and to thereby control the flow of fluid through the valve body. The sleeve valve is carried on a valve stem which, in turn, is moved in response to thermal actuation of a temperature responsive force transmitting device having a remote sensing bulb positioned in the zone referred to above. The valving member is manually adjustable between two extreme axially spaced positions whereby the valve may be manually adjusted to permit no flow or to permit a full fluid flow through the valve irrespective of the response of the thermostatically actuable force transmitting device.

It is important to note that in the instant invention the sleeve valve is carried by the temperature responsive force transmitting device. It will be understood that temperature responsive force transmitting devices are sensitive to the sometimes rather high forces of opposing high fluid pressure conditions and for this reason it has been found to be highly desirable to have the sleeve valve carried and operated by the temperature responsive force transmitting device because this valve member is of course less sensitive to upstream fluid pressure conditions. The pressure sensitive flat valving disk is manually adjustable. Thus, the loading on the thermal sensitive element will be fairly constant regardless of variances in water pressures.

In view of the foregoing it is a principal object of the present invention to provide a fluid control valve of a type having a pair of mutually coacting but independently movable valve members which is particularly designed to be employed in high fluid pressure systems.

More specifically, an object of the invention resides in the provision of a fluid control valve wherein a pair of mutually coacting but independently movable valve members are provided and wherein one of the valve members is movable by a temperature responsive force transmitting device and in which that valve member is of the sleeve valve type, thereby reducing its fluid pressure sensitivity.

These and other objects, advantages and features of the present invention will become apparent from time to time as the following specification proceeds and with reference to the accompanying drawings, wherein:

The figure illustrates a valve constructed in accordance with the present invention in vertical section but with a few parts shown in side elevation for the purpose of clarity.

The valve body 10 may be a one-piece structure formed of brass and having an inlet 11 and an outlet 12 and a passageway 13 communicating the said inlet with the said outlet.

The passageway 13 is defined by a cylindrical flange 14 and by a pair of axially spaced cylindrical lips 15 and 16 which serve to confine a resilient annular seal 17 therebetween. A cylindrically configurated sleeve valve member 18 is slidably guided within the passageway 13 with its outer wall 19 in engagement with the resilient annular seal 17. The sleeve valve member 18 has a chamfered annular lip 20 formed on one end thereof and has an annular recess 21 formed within its cylindrical inner wall 22 at a point adjacent the chamfered annular lip at the uppermost end of the valve member.

A snap ring 23 is fitted within the recess 21 and serves as a seat for one end of a compression spring 24. The spring 24 has its opposite end seated on a stirrup 25 which stirrup is hat-shaped in configuration and has a concavity 26 facing downwardly. The inner wall 22 of the valve member 18 has a radially inwardly extending lip 27 which serves as a seat for four radially outwardly extending flanged portions such as flanged portion 28 of the stirrup 25 to limit the degree of axial movement of that stirrup while allowing water to flow between these flanged portions. The spring 24 then normally maintains the stirrup 25 in engagement with the flange 27.

A flat disk-like valve member 30 is positioned within the inlet chamber 31 formed intermediate the inlet 11 and the passageway 13 coaxially of the valve member 18 so as to have its seating face 32 positioned in the path of movement of the chamfered lip 20 as the valve member 18 is moved axially in an upward direction. The seating surface 32 is formed of a resilient material 33 and is maintained in fixed relation on the flat rigid supporting disk 34 by means of a retaining washer 35 which is fitted on the lowermost end of a shaft 36. The shaft 36 is journalled in a bore 37 formed in the valve body 10 coaxially of the valve member 18 and terminates at its uppermost end in a radially enlarged threaded section 39 which is threadedly mounted within enlarged bore 40 formed within a boss 41 which is integral with the valve body 10. An adjusting knob 42 is formed on the uppermost end of the shaft 36 to provide a means for rotating the threaded section 39 within the enlarged bore 40 to vary the position of the valving member 30 within the chamber 31.

It will thus be observed that if the sleeve valve member 18 remains in the position shown in the drawing, axial movement of the valving member 30 by manual adjustment of the knob 42 will be effective to vary the rate of flow of fluid through the valve body. Conversely, if the valving member 30 remains in a fixed position and the sleeve valve member 18 is moved axially relative thereto fluid flow rate will likewise be varied.

A shaft 45 has a rounded upper end 46 seated in the concavity 26 and extends through a sealing plug 46 which is threadedly mounted in the valve body. The valve plug 46 has a small bore 47 formed in the lowermost end thereof which serves as a guide for the shaft 45 and has an enlarged bore 48 formed therein within which are seated a plurality of chevron seals 49. The chevron seals are annular in configuration and are canted downwardly from center and have a spring biased washer 50 bearing down thereon from above. Compression spring 51 is interposed between the washer 50 and a retaining ring 52 mounted in a recess formed in the uppermost end of the bore 48 and serves as a seat for the uppermost end of the spring. Chevron seals are well understood by those skilled in the art and form no part of the instant invention and so are not described further in detail. It will be understood, however, that these seals are employed for wear takeup purposes since the spring 51 will continuously urge the seals into sealing relation with the shaft 45. It will also be observed that a gasket 53 is interposed between the plug 46 and the valve body to provide a fluid tight seal therebetween.

A cap 54 having an outturned flange 55 is mounted on the lowermost end of the valve body 10 by means of a plurality of screws 56 extending through the flange and into the valve body. A temperature sensitive force transmitting device or a thermal sensitive power unit 57 has a base portion 58 extending through an aperture 59 formed at the lowermost end of the cap 54 and has an enlarged portion 60 seated on the cap 54 adjacent the aperture 59. The thermal sensitive element is of a type well known by those skilled in this art and includes in addition a guide portion 61 and a power member or piston 62 which is axially movable within the guide portion 61.

The temperature sensitive power unit 57 is of the remote sensing type and has a thermal sensing bulb 63 positioned at a point remote from the main casing of the element and this bulb contains a material which is expansible under certain predetermined critical ambient temperature conditions and expansion of this material is communicated to the main casing of the element 57 through a capillary 64. As is well understood by those skilled in this art, expansion of the temperature sensitive material within the bulb 63 will be communicated to the element casing through the capillary 64 and such expansive forces will in turn be transmitted to the piston 62 to cause the piston 62 to move extensibly relative to the guide 61.

The lowermost end of shaft 45 abuts the upper end of power member 62 so that axial movement of member 62 will effect movement of the shaft 45.

A compression spring 70 is interposed between the valve member 30 and stirrup 25 and this spring serves as a return spring for the thermal sensitive element piston 62. It is important to understand that the spring 70 is a weaker spring than the spring 24, which latter spring is employed as an overtravel spring for the thermal sensitive element.

It will be observed then that rises in temperatures ambient the bulb 63 above the critical temperature of the material contained therein will cause the piston 62 to move extensibly relative to the guide 61 and such extensible movement will be transmitted through the shaft 45 and through the relatively stiff overtravel spring 24 to the sleeve valve member 18 to cause the sleeve valve member to move toward the valving member 30 to reduce the flow of water through the valve. If the sleeve valve 18 is actually seated on the valving member 30 and the material within the sensing bulb 63 should continue to expand, such expansion and consequent extensible movement of the piston 62 will be taken up in the overtravel spring 24.

Should it be desired to manually shut off the flow of water through the valve assembly, the knob 42 can be rotated until the valving member 30 is moved into engagement with the chamfered annular lip 33. If it is desired to make sure that the valve is maintained in a closed position regardless of variances in temperature ambient the sensing bulb 63, the valving member 30 should be manually adjusted to its lowest possible position. In such case the valving member 30 will remain in engagement with the sleeve valve member 18 even though the piston 62 is in its most retracted position. Conversely, by positioning the valving member 30 adjacent the inner wall of the valve body at the upper end of the chamber 31 the valve can be kept in a port open, full flow condition irrespective of variances in temperature ambient the sensing bulb 63.

It will be observed that in the arrangement shown the operation of the temperature responsive force transmitting device will not be adversely affected by high pressure fluid conditions because the valve member operated thereby is a sleeve valve which, of course, is relatively insensitive to upstream fluid pressure conditions.

It will be understood that this embodiment of the present invention has been used for illustrative purposes only and that various modifications and variations in the instant invention may be effected without departing from the spirit and scope of the novel concepts thereof.

I claim as my invention:

1. A fluid control valve comprising a valve body having an inlet and an outlet and a passageway communicating said inlet with said outlet, a first valve member presenting a flat seating surface, a sleeve valve member guided for axial movement within said passageway and having an annular lip cooperable with said seating surface to control the rate of flow of liquid through said sleeve valve and hence through said control valve and to prevent the flow of liquid in one position of the sleeve valve, a thermal sensitive element casing mounted on said valve body and having an element extensible therefrom, an over-travel coil spring interconnecting said element with said sleeve valve member to transmit extensible movement of said element to said sleeve valve member to move the latter relative to said first valve member, thermal sensing means positioned at a point remote from said thermal element casing, means interconnecting said thermal sensing means and said thermal element casing whereby movement of said element can be effected as a function of variances in temperature and in said sensing portion, manual means for moving said first valve member relative to said sleeve valve member, and a bias coil spring concentrically positioned with respect to the over-travel coil spring and connected to said manual means to bias said manual means and to cushion said seating surface as said annular lip moves into contact with said seating surface.

2. A fluid control valve comprising a valve body having a side wall and two opposed end walls and having an inlet and an outlet formed within the said side wall and having a passageway communicating said inlet with said outlet, inlet and outlet chambers defined by said valve body on opposite sides of said passageway and adjacent said inlet and said outlet ports respectively, a first shaft threadedly journaled within one of said end walls, a flat valve member mounted on the first shaft within said inlet chamber, wherein a portion of said shaft extends exteriorly of said valve body and has gripping means formed thereon whereby an operator can turn the same to axially move the said valve member, a sleeve valve guided for slidable movement within said passageway, a first coil spring connected between said flat member and said sleeve valve to bias said first shaft, means providing a seal between said valve body and said sleeve valve, wherein said sleeve valve is movable coaxially of said first shaft and has a chamfered lip formed therearound on the end thereof nearest said valve member, a resilient seating surface formed on said flat valve member in the path of movement of said chamfered lip, a second shaft coaxial with said first shaft and slidably guided within the opposite end of said valve body, means providing a fluid seal between said valve body and said second shaft, a second coil spring interconnecting said second shaft and said sleeve valve and concentrically positioned with respect to said first coil spring whereby movement of said second shaft will be transmitted to said sleeve valve to effect movement thereof toward and ultimately into sealing contact with said resilient seating surface to thereby block said passageway whereby said resilient seating surface and said spring cushion said flat valve member, a temperature sensitive power unit having an element guide portion mounted on said valve body and having an element guided therein and extensible therefrom and having a temperature sensing portion disposed remotely therefrom and connected thereto whereby variances in temperatures ambient said sensing portion will be transmitted to said guide portion to effect extensible movement of said element from said guide portion, means interconnecting said element with said second shaft, and means biasing said element to a retracted position with respect to said guide portion.

References Cited by the Examiner

UNITED STATES PATENTS

| 2,141,614 | 12/1938 | Mott | 236—99 |
| 2,538,436 | 1/1951 | Weinberg | 236—42 X |
| 3,036,777 | 5/1962 | Budde | 236—12 |

FOREIGN PATENTS

| 89,799 | 10/1960 | Denmark. |
| 906,202 | 9/1962 | Great Britain. |
| 934,028 | 8/1963 | Great Britain. |

ALDEN D. STEWART, *Primary Examiner.*